W. H. PUTNAM.
GREASE CUP.
APPLICATION FILED OCT. 5, 1917.

1,260,043.

Patented Mar. 19, 1918.

Inventor
William H. Putnam,
By Dodge & Sons,
Attorneys

UNITED STATES PATENT OFFICE.

WILLIAM H. PUTNAM, OF MADISON, WISCONSIN, ASSIGNOR TO MADISON-KIPP LUBRICATOR COMPANY, OF MADISON, WISCONSIN, A CORPORATION OF WISCONSIN.

GREASE-CUP.

1,260,043.  Specification of Letters Patent.  Patented Mar. 19, 1918.

Application filed October 5, 1917. Serial No. 194,944.

*To all whom it may concern:*

Be it known that I, WILLIAM H. PUTNAM, a citizen of the United States, residing at Madison, in the county of Dane and State of Wisconsin, have invented a certain new and useful Improvement in Grease-Cups, of which the following is a specification.

Figure 1:
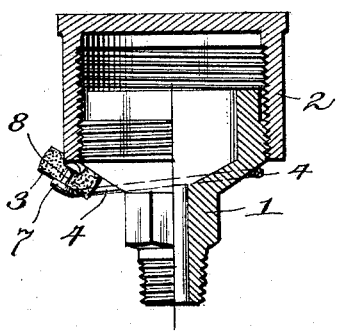
Figure 2:
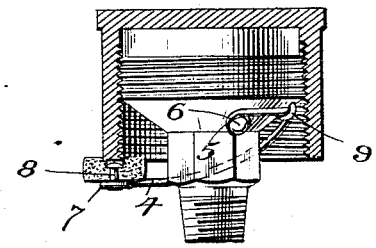
Figure 3:
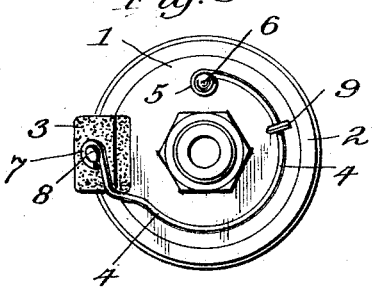

This invention relates to grease cups employed for supplying lubricant to journals and bearings, and it consists primarily in providing the same with a yieldingly-supported wiper co-acting with the annular edge or open end of the cup, to remove dust and dirt therefrom when removing the cup for filling. The invention is susceptible of embodiment in somewhat variant forms, a preferred form being illustrated in the accompanying drawing, in which:

Figure 1 is a partly sectional elevation of the improved cup with the cap member in its initial position, or the position it occupies when charged with lubricant;

Fig. 2, a similar view but with the base in full lines and with the cap advanced to its lowermost position;

Fig. 3, a bottom face view of the cup and wiper; and

Figure 4:
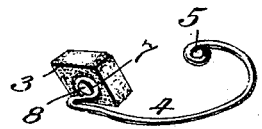

Fig. 4, a perspective view of the wiper and its supporting spring-arm detached from the base to which it is normally secured.

In the use of grease cups, particularly on automobiles and other road vehicles, dust and grit are found to accumulate on the annular edge or open end of the cup or cap member, and this accumulation in the absence of great care, is liable to be carried into the cup and mingled with the lubricant in the act of charging the cup, with consequent injury to and excessive wear of the parts to which the lubricant is applied. While this difficulty may be minimized by special means, the presence of the dust and grit is under any and all conditions, highly undesirable, and its removal important.

Referring again to the drawings, my improved construction will be explained. 1 indicates the usual base or supporting member, here shown as comprising an annular body or main portion and an externally threaded tubular neck or nipple having a polygonal wrench-receiving section intermediate the main body and the threaded nipple. The peripheral surface of the body is screw-threaded or otherwise fashioned, to enable it to interlock or make connection with a correspondingly threaded or fashioned cup or cap member 2. In the present instance the base member 1 is shown provided with a peripheral thread, and the cup or cap member is internally threaded to fit and screw upon the peripheral screw thread of the base, so that a secure and close fitting connection is obtained between the two, and so also that by rotating the cap member it may be lowered and made to force its contained lubricant through the central discharge opening of the base, as required. Thus far the construction is that commonly employed in grease cups of this general character.

By reference to Figs. 1 and 2 it will be observed that the annular edge or lower end of the cup or cap member is exposed to dust and grit carried by the air or contained in mud and water thrown by the wheels of the vehicle, and that hence said edge being commonly coated with a film of lubricant, will speedily become covered with such dust and grit. The same is true of that portion of the internally threaded surface of the cup or cap member which is advanced beyond the threaded portion of the base 1, but this is practically or completely removed in the act of unscrewing the cup or cap member from the base, though it may adhere to and hang from the annular lower edge of the cap member.

To remove all dust and grit adhering to this exposed annular edge or surface, I provide a wiper or pad 3 of any suitable material, preferably felt, and mount the same upon an elastic or yielding support 4. In the drawing this support is shown in the form of a curved wire spring, provided at one end with an eye 5 to receive a fastening screw or rivet 6, and at the opposite end with a similar eye 7 to receive a rivet or equivalent fastening 8 by which the wiper 3 is attached to said supporting arm. The pad-carrying end of the spring arm is advisably fashioned to give a somewhat extended support to the outer face of the pad, which latter when the cup or cap member 2 is in its initial adjustment, stands at an angle to the plane or face of the annular end of the cup, as shown in Fig. 1. In addition to the fastening 6 a staple or eye 9 is provided, being made integral with or secured to the base 1 in such manner as to hold the attaching end of the support 4 in substantially horizontal position, as best seen in Fig. 2.

Under this arrangement the pad will as above noted, take the position shown in Fig. 1 when the cup or cap 2 is in its initial adjustment, but as said cap is screwed down or advanced to force out the lubricant, the arm 4 will be forced downward, and the pad or wiper 3 will be caused to take a horizontal position, or to bear flat against the annular edge which is to be wiped or cleaned. The yielding of the spring arm will under this arrangement be in part a torsional or twisting action, in that part between the two points of holding or attachment, and a flexing action in the remaining length of the support. This allows for a quite considerable movement of the pad or wiper without material variation in the pressure of the pad against the surface to be cleaned, and guards against loss of resilience or adequate pressure in and by the supporting member 4.

It is of course obvious that any suitable form of elastic or yielding arm or support may be employed for the pad or wiper, but that shown is found in practice to be at once efficient, economical, and free from liability of derangement, and is hence illustrated as the preferred embodiment of my invention. I believe myself, however, to be the first to provide a pad or wiper adapted to bear against and follow the annular end or edge of a grease cup during adjustment and removal, and hence intend to claim the same broadly and regardless of the specific form or character of the support. It will be noted that the pad being carried by a spring and pressed with considerable force against the end of the cup, will serve to hold the same against accidental turning, either by reason of vibration of the vehicle or light contact with other objects.

While I have shown the support 4 attached to and carried by the base 1, it is obvious that it may be attached to any other fixed support, provided only it hold the pad or wiper in proper relation to the surface to be cleaned. I therefore do not desire to be restricted to mounting the spring-support or pad-carrier upon the base 1, though such is the preferred mounting.

In the foregoing specification I have referred to the grease-holding receptacle as a cup or cap, these two designations being used interchangeably for the same member, according to its location. In other words, when applied to the usual base forming a complementary member of a grease cup, it is generally termed a cup, but when applied to the similarly threaded base of a grease gun, it is usually styled a cap. The same part or member is meant, by whichever term it may be designated.

Similarly, the element employed to remove grease, dust, and the like, from the annular end of the cup or cap, is termed a pad or wiper, the two terms referring to the same part.

Having thus described my invention, what I claim is:—

1. In combination with the base and cup member of a grease cup, a wiper yieldingly held in contact with the annular edge or end of the cup member, and serving to remove therefrom accumulated dust, lubricant, and the like, when the cup member is turned for removal from the base.

2. In combination with the cup member of a grease cup, a wiper yieldingly held in contact with the annular edge or open end of said cup, and adapted to bear against the same as said cup is rotated, and a support for said wiper.

3. In combination with the base and cup member of a grease cup, one rotatable relatively to the other, a wiper bearing against the annular edge or open end of the cup member; and a resilient support for said wiper serving to maintain it in contact with said annular edge during varying adjustment of the base or cup, one in relation to the other.

4. In combination with base and cup members of a grease cup, a wiper positioned to bear against the annular edge or open end of the cup member; and a resilient support for said pad secured to and carried by the base member.

5. In combination with a base member and a cup member constituting a grease cup; a wiper positioned to bear against the annular edge or open end of the cup member; and a resilient support for said wiper having one portion subject to torsion and another subject to a direct flexing action.

In testimony whereof I have signed my name to this specification.

WILLIAM H. PUTNAM.